UNITED STATES PATENT OFFICE.

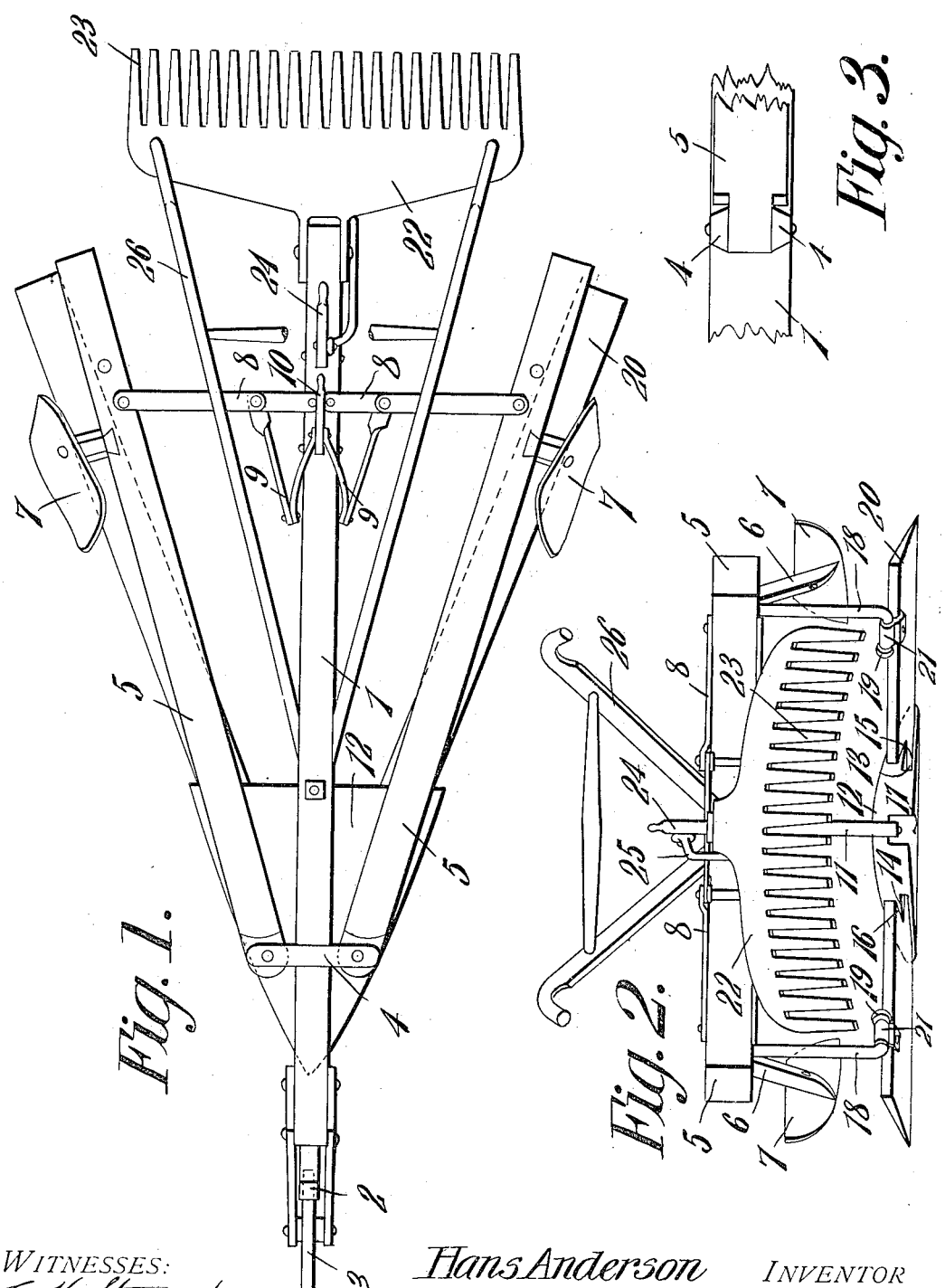

HANS ANDERSON, OF CRYSTAL, NORTH DAKOTA.

CULTIVATOR.

No. 839,445.   Specification of Letters Patent.   Patented Dec. 25, 1906.

Application filed August 4, 1906. Serial No. 329,221.

*To all whom it may concern:*

Be it known that I, HANS ANDERSON, a citizen of the United States, residing at Crystal, in the county of Pembina and State of North Dakota, have invented a new and useful Cultivator, of which the following is a specification.

This invention has relation to cultivators; and it consists in the novel construction and arrangement of its parts as hereinafter shown and described.

The object of the invention is to provide a cultivator having adjustable side blades which may be used either for cutting weeds or for agitating the soil and are susceptible of adjustment into positions to perform either operation stated. The said cultivator is also provided with an attachment which may be used for the purpose of harrowing or pulverizing the soil.

Various novel features of adjustment will appear as the invention is explained in detail.

In the drawings, Figure 1 is a top plan view of the cultivator. Fig. 2 is an end view of the same. Fig. 3 is a side elevation of the forward portion of the beam of the cultivator with parts broken away.

The cultivator consists of the beam 1, which is provided at its forward end with a clevis 2 and the colter-wheel 3. The cross-bars 4 are countersunk into the upper and lower edges of the said beam and are dovetailed therein. The forward ends of the wings 5 are pivoted between the ends of the cross-bars 4. A wing 5 is located on each side of the beam 1. The plow-standards 6 are mounted upon the said wings 5 and carry at their lower ends the plow-shovels 7. The toggle-links 8 are pivoted together at their inner ends, and the outer ends of said links are pivoted to the beam 1 and the wings 5, respectively. The links 9 are pivotally attached to the intermediate pivotal points of the toggle-links 8, and the working ends of the lever 10 are pivotally attached to the forward ends of the links 9. The said lever 10 is in turn fulcrumed upon the beam 1. The standard 11 depends from the forward portion of the said beam 1 and is provided at its lower end with the horizontally-disposed blade 12. The rear edge of the said blade is provided with the recesses 13, each of which is provided at its inner edge with the tongue 14, which divides the said recess into horizontally-disposed portions 15 and the inclined portions 16. The under surface of the blade 12 is slightly concaved, as at 17. The standards 18 depend from the rear portions of the wings 5 and are provided at their lower ends with the horizontal extensions 19.

The blades 20 are pivoted at their forward ends in the recesses 13 of the blade 12 and are provided at intermediate points with the sleeves 21, which receive the portions 19 of the standards 18. The forward ends of the said blades 20 may be located in the horizontal portions 15 of the said recesses 13 or in the inclined portions 16 of the said recesses. It is obvious that when the forward ends of the said blades 20 are in the portions 15 of the said recesses 13 the said blades will be in horizontal positions and that when the forward ends of the said blades are in the inclined portions 16 of the said recesses 13 the said blades will be in inclined positions. In either instance the forward ends of the said blades are pivotally connected with the blades 12. The harrow member 22 is pivotally attached to the rear end of the beam 1. Said member 22 preferably consists of a piece of sheet metal having the teeth 23 formed at its lower edge. The said teeth are adapted to pulverize the soil. The lever 24 is fulcrumed upon the beam 1 and is connected by means of the link 25 with the said harrow member 22. By the manipulation of the said lever the angle of inclination of the harrow member 22 with relation to the beam 1 may be adjusted and varied. By the manipulation of the lever 10 the angle of inclination of the toggle-links with relation to each other may be varied in order to spread the rear ends of the wings 5 or to bring the same together. When the implement is intended to be used for cutting weeds, the blades 20 are adjusted in their horizontal positions and when it is intended that the said blades should cut the soil they are disposed in inclined positions, as above described. The forward ends of the handles 26 are attached to the beam 1, and the power ends of the levers 10 and 24 are located between the said handles and are within easy access of the plowman.

Having described my invention, what I claim as new, and desire to secure by Letters Patent, is—

An implement such as described comprising a beam, a standard attached to the beam, a blade fixed to said standard and being substantially horizontally disposed, wings pivoted to said beam, standards depending from said wings, blades pivoted to the last said standard and being pivotally attached at their forward ends to the first said blade.

In testimony that I claim the foregoing as my own I have hereto affixed my signature in the presence of two witnesses.

HANS ANDERSON.

Witnesses:
 CLARA O'SULLIVAN,
 JOHN O. CONNOR, Jr.